Oct. 23, 1956 A. G. W. UITJENS 2,768,288
FREQUENCY-DEMODULATION CIRCUIT
Filed Jan. 22, 1952
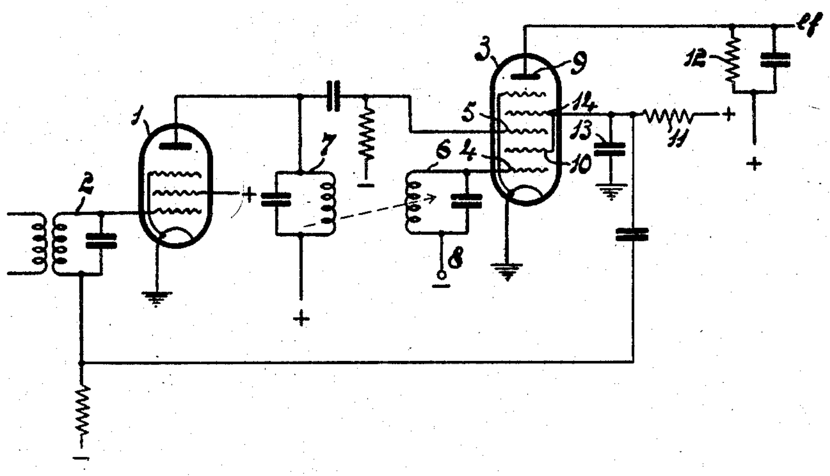
INVENTOR
Abraham Gertrudas Wilhelmus Uitjens
By [signature]
Agent

United States Patent Office 2,768,288
Patented Oct. 23, 1956

2,768,288

FREQUENCY-DEMODULATION CIRCUIT

Abraham Gertrudas Wilhelmus Uitjens, Eindhoven, Netherlands, assignor to Hartford National Bank and Trust Company, Hartford, Conn., as trustee Application January 22, 1952, Serial No. 267,573

Claims priority, application Netherlands January 27, 1951

4 Claims. (Cl. 250—27)

This invention relates to a frequency-demodulation circuit containing an electronic valve having at least two control-grids wherein the oscillation to be demodulated is supplied to the control grids with a relative phase displacement determined by the frequency deviation of the oscillation.

In a known circuit of this kind the two control grids of the tube are adjusted so that during a portion of the period of the alternating voltage, these grids do pass current, while during the remaining portion of the period, the alternating voltage has an amplitude such that the electron current saturates. Consequently, variations in the amplitude of the oscillation to be demodulated do not cause variations in the demodulated oscillation produced in the anode-circuit of the tube, and hence the output signal in the anode circuit varies only with frequency variations of the input signal.

The invention has for its object to provide a variant of the circuit in which these amplitude variations are removed in a different manner, and the circuit is made more sensitive to frequency-variations of the incoming oscillation.

According to the invention, the second control-grid is adjusted as a current distribution grid between the anode of the tube and a screen grid which is arranged between the two control-grids. Voltage is supplied to the screen grid through a resistor which is decoupled for the frequencies of the incoming oscillations but which is not decoupled for the frequencies of the demodulated oscillations.

In order for the invention to be more clearly understood and readily carried into effect, it will now be described more fully with reference to the accompanying drawing, in which one embodiment is given by way of example.

Referring to the single figure of the drawing, 1 designates a pre-amplifier tube for amplifying the frequency-modulated oscillations which are supplied to it by way of an input circuit 2. The anode circuit of the discharge tube 1 is coupled to the two control-grids 4 and 5 of a second tube 3 through coupled circuits 6 and 7, so that the demodulated oscillation appears across the output filter 12 in the anode-circuit of the tube 3.

A bias voltage is supplied to the terminal 8 in the circuit of the first control-grid 4 (counted from the cathode), so that during a portion of the period of the input signal voltage across the circuit 6 this grid does not pass current. If desired, the grid 5 may be adjusted in a similar manner.

According to the invention, the supply-circuit of a screen grid 10 arranged between the control grids 4 and 5 includes a resistor 11 on the order of several 10,000 ohms. By means of a capacitor 13 this resistor is decoupled for frequencies of the incoming oscillation, but is not decoupled for frequencies of the demodulated oscillations, so that the grid 5 is adjusted as a current-distribution grid between the anode 9 and the screen grid 10 of the tube 3.

The circuit operates as follows:

The voltages across the circuits 6 and 7 exhibit a phase-difference determined by the frequency-deviation of the input-oscillation, so that the voltage across the output filter 12 also varies with this frequency deviation. However, the output voltages must vary as little as possible with amplitude variations of the input-voltage.

Amplitude variations of the voltage at the grid 4 will produce by means of screen grid 10, a corresponding low-frequency current which produces a low-frequency voltage across resistor 11 in phase-opposition to the amplitude variations, with the result that their effect on the output voltage is reduced. In this case, the grid 5 may have supplied to it so large a negative bias voltage that during the negative portion of the input signal voltage cycle the grid does not pass current and during the positive portion of the cycle sends the current into saturation so that amplitude variations of the voltage at the grid 5 do not act on the voltage produced across the output filter 12.

On the other hand, the resistor 11 increases the circuit sensitivity to frequency variations of the input oscillation. This occurs because, as a result of the incidental variation of the phase-displacement between the voltages across the circuits 6 and 7, the grid 5 passes more current corresponding to a higher voltage across the filter 12, and this current is abstracted from the current passing to the screen grid 10, with the result that this screen grid attains a higher potential. Consequently, the amplification of the tube part cathode—grid 4—grid 10—increases and the voltages across the filter 12 is further increased.

The circuit may be further improved by supplying the voltage across the resistor 11 to the grid of the pre-amplifier tube 1, as shown in broken lines in the figure.

Amplitude-variations of the input oscillation across the circuit 2 will in turn produce corresponding low-frequency voltage variations across the resistor 11 and these variations are supplied to the grid circuit of the tube 1 in a direction controlling the gain of the said tube, so that the voltages across the circuits 6 and 7, and hence also the output voltage across the filter 12, will be substantially independent of said amplitude variations (negative envelope feed-back).

A frequency variation of the input oscillation will bring about a current variation which is transmitted by the grid 5, so that the voltage of the screen grid 10 and the bias voltage of the tube 1 are altered and a larger voltage variation is produced across the output filter 12.

In principle, the output voltage may be abstracted from the screen grid 10 and the low-frequency voltage of the anode may be fed back to the grid of the pre-amplifier tube 1, but such a circuit is inferior to the circuit described above.

It may be adantageous to apply a constant potential to the screen grid 14 shown in the figure or, if desired, the constant potential at the screen grid may be omitted, in order to improve the current distribution.

What I claim is:

1. Apparatus for demodulating an incoming frequency modulated carrier wave subject to amplitude variations, comprising an electron discharge tube provided with a cathode, a first control grid, a screen grid, a second control grid and an anode in the order named, means to derive first and second components of said wave, said components exhibiting a mutual phase-difference which varies in accordance with the frequency variations of said wave, means to apply said first and second components to said first and second control grid respectively, means to bias said first control grid relative to said cathode to such an extent that no current passes said first grid during a portion of the period of said first component, a resistance, means to apply a fixed potential through said resistance to said screen-grid, means connected to said screen-grid effectively by-passing said screen-grid to ground for frequencies falling wthin the frequency range of said components, while ineffective for by-passing said screen-grid to ground for frequencies falling within the range of the modulation frequencies of said carrier wave, whereby said amplitude variations are suppressed, and means for biasing said second control grid to control the distribution of current between said screen-grid and said anode so as to increase the amplitude of the demodulated signal.

2. Apparatus for demodulating an incoming frequency modulated carrier wave subject to amplitude variations, comprising an electron discharge tube provided with a cathode, a first control grid, a screen grid, a second control grid and an anode in the order named, means to derive first and second components of said valve, said components exhibiting a mutual phase-difference which varies in accordance with the frequency variations of said wave, means to apply said first and second components to said first and second control grid respectively whereby said anode yields said demodulated wave, means to bias said first control grid relative to said cathode to such an extent that no current passes said first grid during a portion of the period of said first component, a resistance, means to apply a fixed potential through said resistance to said screen-grid, means connected to said screen-grid effectively by-passing said screen-grid to ground for frequencies falling within the frequency range of said components, while ineffective for by-passing said screen-grid to ground for frequencies falling within the range of the modulation frequencies of said carrier wave, whereby said amplitude variations are suppressed, and means for biasing said second control grid to control the distribution of current between said screen-grid and said anode so as to increase the amplitude of the demodulated signal.

3. Apparatus as set forth in claim 1 further including an amplifying stage preceding said tube, and feedback means connected to feed the alternating voltage developed across said resistance to the input of said stage as a negative envelope feed-back voltage.

4. Apparatus as set forth in claim 1, further characterized in that the said means for biasing said second control grid and the amplitude of said second component are such that no current passes said second control grid during the negative portion of the period of said second component and that the anode circuit of said tube is saturated during the positive portion of the period of the second component.

References Cited in the file of this patent

UNITED STATES PATENTS

| | | |
|---|---|---|
| 2,067,048 | Gill et al. | Jan. 5, 1937 |
| 2,261,286 | Rankin | Nov. 4, 1941 |
| 2,269,687 | Rath | Jan. 13, 1942 |
| 2,274,184 | Bach | Feb. 24, 1942 |
| 2,343,263 | Okrent | Mar. 7, 1944 |
| 2,368,052 | Unger | Jan. 23, 1945 |
| 2,662,179 | Hepp | Dec. 8, 1953 |
| 2,698,899 | Boelens | Jan. 4, 1955 |